United States Patent [19]
Kataoka

[11] Patent Number: 5,862,382
[45] Date of Patent: Jan. 19, 1999

[54] PROGRAM ANALYSIS SYSTEM AND PROGRAM ANALYSIS METHOD

[75] Inventor: Yoshio Kataoka, Fuchu, Japan

[73] Assignee: Kabushiki Kaisha Toshiba, Kawasaki, Japan

[21] Appl. No.: 646,065

[22] Filed: May 7, 1996

[30] Foreign Application Priority Data

May 8, 1995 [JP] Japan .................................. 7-109525

[51] Int. Cl.⁶ .................................................. G06F 09/45
[52] U.S. Cl. .......................................... 395/708; 395/701
[58] Field of Search ................................... 395/708, 703, 395/705, 710, 701, 702, 183.01, 183.22

[56] References Cited

U.S. PATENT DOCUMENTS

| | | | |
|---|---|---|---|
| 4,860,203 | 8/1989 | Corrigan et al. | 395/705 |
| 4,931,928 | 6/1990 | Greenfeld | 395/708 |
| 5,375,125 | 12/1994 | Oshima et al. | 395/183.14 |
| 5,408,660 | 4/1995 | Kitadate | 395/708 |
| 5,432,942 | 7/1995 | Trainer | 395/708 |
| 5,469,572 | 11/1995 | Taylor | 395/710 |

*Primary Examiner*—James P. Trammell
*Assistant Examiner*—Demetra R. Smith
*Attorney, Agent, or Firm*—Finnegan, Henderson, Farabow, Garrett & Dunner, L. L. P.

[57] ABSTRACT

It is an object of this invention to provide a program analysis system and a program analysis method which efficiently analyze the source code of a program through static analysis and, based on the analysis result, makes it easy for the user to understand the process contents and source code containing input/output specifications. To achieve this object, the data information extracting means (1) extracts from the source code the data information representing the structure of data items contained in the source code. The relation information extracting means (5) extracts relation information representing the relation among data items for each position in the source code, based on the source code and the data information. The process information extracting means (6) extracts various types of relation information on each process in the source code as the process information representing the process, based on the source code, data information, and relation information. The specifying module (7) enables the user to specify an output range and form. The outputting means (2) outputs extracted information in the specified form.

36 Claims, 16 Drawing Sheets

FIG. 3

```
#INCLUDE "SAMPLE08.H"

VOID INSERT_ITEM(STRUCT LIST *LIST, STRUCT LIST *ITEM)
{
   ITEM->NEXT = LIST->NEXT;
   LIST->NEXT = ITEM;
}
```

FIG. 4

```
STRUCT LIST {
   INT DUMMY;
   STRUCT LIST *NEXT;
};
```

FIG. 5

```
# 1 "SAMPLE08.C"
# 1 "./SAMPLE08.H" 1
STRUCT LIST {
   INT DUMMY;
   STRUCT LIST *NEXT;
};
# 2 "SAMPLE08.C" 2

VOID INSERT_ITEM(STRUCT LIST *LIST, STRUCT LIST *ITEM)
{
    ITEM->NEXT = LIST->NEXT;
    LIST->NEXT = ITEM;
}
```

FIG. 6

```
#INCLUDE "SAMPLE08.H"

VOID INSERT_ITEM(STRUCT LIST *LIST, STRUCT LIST *ITEM)
{
@P001:
@S001:  ITEM->NEXT = LIST->NEXT;
@P002:
@S002:  LIST->NEXT = ITEM;
@P003:
}
```

FIG. 8

| 0001 | STRUCT LIST | INT | DUMMY | STRUCT LIST* | NEXT | 0 |

FIG. 11

| INSTRUCTION ID | POSITION ID (BEFORE PROCESS) | POSITION ID (AFTER PROCESS) |
|---|---|---|
| 0001 | 0001 | 0002 |
| 0002 | 0002 | 0003 |

FIG. 15

INCLUDE "SAMPLE08.H"

VOID APPEND_ITEM(STRUCT LIST *LIST, STRUCT LIST *ITEM)
{
    STRUCT LIST *CUR;
                      :
@P1012:
@S1012:   FOR (CUR = LIST; CUR->NEXT; CUR = CUR->NEXT);
@P1013:
@S1013:   CUR->NEXT = ITEM;
@P1014:
                      :
}

DATA RELATION INFORMATION

| POSITION ID | GROUP ID | RELATION ID | | | |
|---|---|---|---|---|---|
|  | 1002 | 2001 | 2002 | 2003 |  |
| 0002 | 1002 | 2001 | 2002 | 2003 | 2004 |
| 0003 | 1003 | 2001 | 2002 | 2004 | 2005 |

DATA GROUP INFORMATION

| GROUP ID | DATA ID | | | | |
|---|---|---|---|---|---|
| 1001 | 1101 | 1102 | 1103 | 1104 | 1105 |
| 1002 | 1101 | 1102 | 1103 | 1104 | 1105 |
| 1003 | 1101 | 1102 | 1103 | 1104 | 1105 |

DATA INFORMATION

| DATA ID | DATA NAME | TYPE ID | POINTER DEPTH |
|---|---|---|---|
| 1101 | LIST | 0001 | 1 |
| 1102 | ITEM | 0001 | 1 |
| 1103 | NIL | 0001 | 0 |
| 1104 | NIL | 0001 | 0 |
| 1105 | NIL | 0001 | 1 |

RELATION INFORMATION

| RELATION ID | ELEMENT DATA ID | | ELEMENT DATA ID | | KIND |
|---|---|---|---|---|---|
| 2001 | 1102 | NIL | 1103 | NIL | → |
| 2002 | 1101 | NIL | 1104 | NIL | → |
| 2003 | 1104 | NEXT | 1105 | NIL | == |
| 2004 | 1103 | NEXT | 1105 | NIL | == |
| 2005 | 1104 | NEXT | 1103 | | → |

*FIG. 10*

```
#INCLUDE "SAMPLE08.H"

VOID APPEND_ITEM(STRUCT LIST *LIST, STRUCT LIST *ITEM)
{
    STRUCT LIST *CUR;
                                :
@P1023:
@S1023:  IF (ITEM->NEXT)
@P1024:
@S1024     CUR = ITEM->NEXT;
@P1025:
           ELSE
@S1025:    CUR = LIST;
@P1026:
@S1026:  LIST = ITEM;
@P1027:
                                :
}
```

*FIG. 18*

PROGRAM ANALYSIS SYSTEM AND PROGRAM ANALYSIS METHOD

BACKGROUND OF THE INVENTION

The present invention relates to a program analysis system and a program analysis method which efficiently analyze the source code of a computer program by static analysis, and make it easy to understand the source code contents including process contents and input/output specifications by providing the result of the analysis.

During the inspection of software development and maintenance, it is necessary to analyze the source code contents or, process contents and/or input/output specifications in order to review the source code of a computer program or to perform reverse-engineering.

One of the prior arts to analyze the source code is to actually perform the test execution of the program and the data processing by generating the execution module or using an interpreter (dynamic analysis).

One of other analysis techniques is the symbolic execution of the program, that is, the static analysis. Typically, the static analysis represents elements, such as variables in the program, as abstract symbols like the possibility of error value instead of actual attribute values. And the contents of the program processing is represented as combinations of the symbols.

Another technique for analyzing the source code of a program is to read and understand it step by step.

However, the existing techniques have drawbacks described below.

First, dynamic analysis cannot be applied when the program cannot be executed due to an error. Second, it is cumbersome to generate the execution module for each change of the program. Third, to perform the test execution of a part of the program, it is troublesome because special program modules like drivers and stubs are required. Fourth, the test execution needs test data, and it is difficult and complicated to generate test data conforming to conditions which perfectly matches the object of the analysis.

Fifth, the existing symbolic execution is able to abstractly analyze data transitions; however, it is difficult to understand the input/output specifications of the source code, especially in case that the executed contests varies according to the concrete input data.

Sixth, reading and understanding the source code step by step requires much labor, and the work quality depends largely on the skillfulness of the worker.

It is an object of the present invention to solve said drawbacks, more specifically, an object of the present invention is to provide a program analysis system and a program analysis method which efficiently analyze the source code of a computer program by static analysis, and make it easy to understand the source code contents including the process contents and input/output specifications by providing the result of the analysis. In addition, it is still another object of the present invention to provide an easy-to-use program analysis system and a program analysis method.

SUMMARY OF THE INVENTION

In one aspect of the present invention, data information which represents the data structure in the source code is extracted from the source code. This process means to obtain the table of data which is processed by the source code. Understanding data helps understanding the source code contents. In this aspect of the present invention, for each position of the source code, relation information representing relations between data is also extracted based on the source code and the data information. This identifies where in the source code each extracted data item has a relation and which relation it has. Then, understanding the relations between data make it easy to understand the source code contents.

Each relation information of each process in the source code is also extracted as process information representing the process, based on the source code, data information and the relation information. Since each process in the source code is understood by understanding how data relations between data changes before and after the process, understanding the source code contents becomes easy.

Preferably, the range from which the information is extracted is not whole source code but is limited to necessary part of the source code, then the process is improved.

In an other preferred embodiment, the range of information to be output is not whole information but is limited to necessary part of information, then the information understanding becomes easy.

In another preferred embodiment, the user can specify the output information form, such as a detail level or format, to satisfy his needs.

BRIEF DESCRIPTION OF DRAWINGS

FIG. 3 shows an example of program source code by C programming language in the first embodiment of the present invention.

FIG. 4 shows an example of included file by C programming language in the first embodiment of the present invention.

FIG. 5 shows the source code as the result of that the included file of FIG. 4 had been added into the source code of FIG. 3 in the first embodiment of the present invention.

FIG. 6 shows an example of source code as the result of labeling for the source code of FIG. 3 in the first embodiment of the present invention.

FIG. 8 shows an example of data information in the first embodiment of the present invention.

FIG. 10 shows relation information as the result of the modification to relation information of FIG. 9 in the first embodiment of the present invention.

FIG. 11 shows an example of process information in the first embodiment of the present invention.

FIG. 15 shows an example of source code including the repetition structure in the second embodiment of the present invention.

FIG. 18 shows an example of the program source cod including the selection structure in the third embodiment of the present invention.

Figure 1:
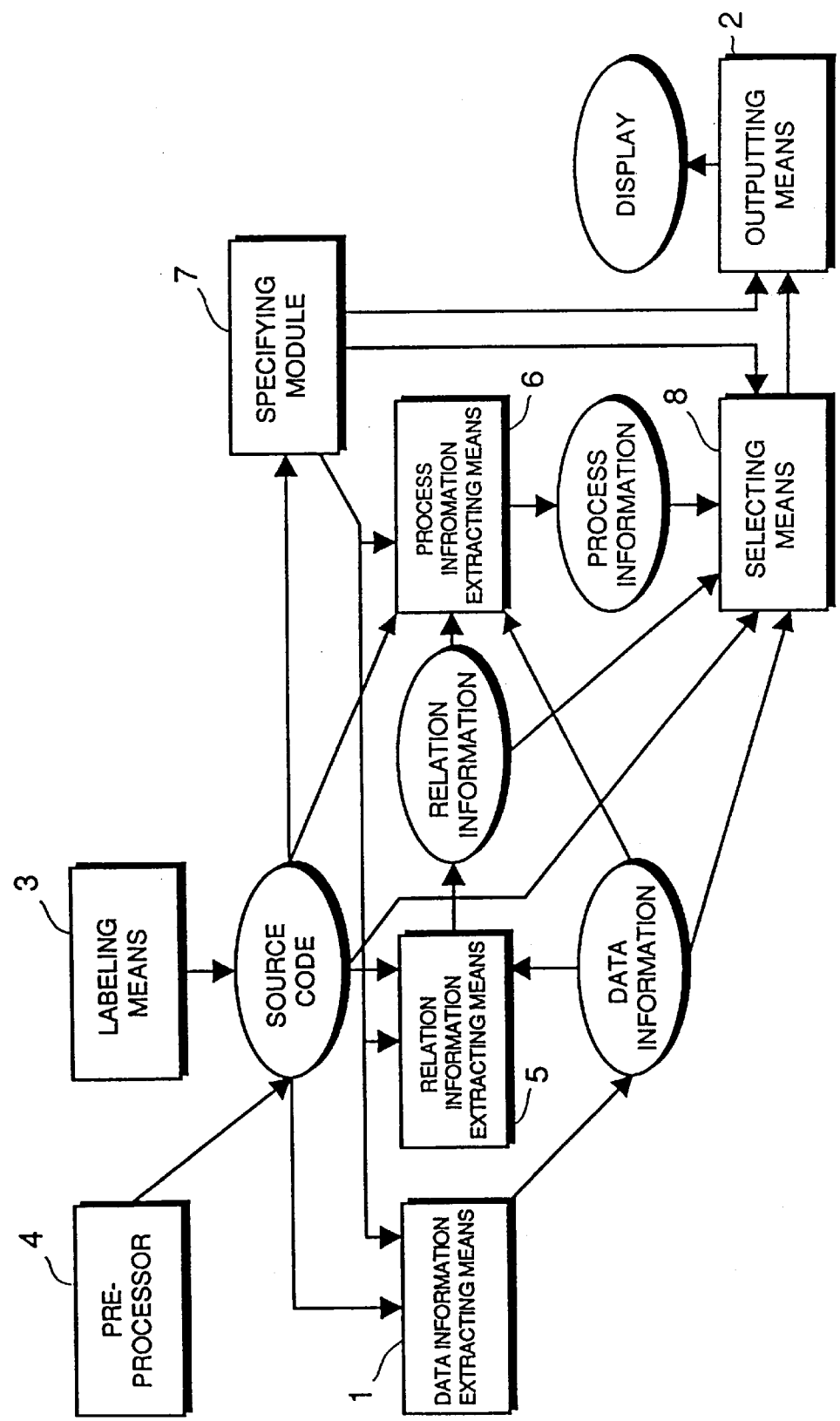
FIG. 1 is a block diagram showing the structure of a program analysis system in the first embodiment of the present invention.

In each Figure, symbols show:
1; data information extracting means
2; outputting means
3; labeling means
4; pre-processor
5; relation information extracting means
6; process information extracting means
7; specifying module
8; selecting means.

DETAILED DESCRIPTION OF PREFERRED EMBODIMENTS

Next, the preferred embodiments of the present invention are described more in detail with reference to the accompanying drawings. Each function of the embodiments is executed by a software component which controls a computer and its peripherals. Because computer and software configurations vary from system to system, virtual circuit blocks, each of which corresponds to a function or a process of the embodiment, are used in the following discussion.

(1) Configuration of the First Embodiment

The first embodiment is a program analysis system corresponding to claims 1 to 9 and a program analysis method (claims 14 to 22) which is executed on this program analysis system. It is an object of the first embodiment to provide a program analysis system and a program analysis method which perform the static analysis of source code to efficiently analyze it and, based on the analysis result, make it easy to understand the contents of the source code containing the process contents and input/output specifications. It is another object of the first embodiment to provide an easy-to-use program analysis system and program analysis method.

FIG. 1 is a functional block diagram showing the configuration of the program analysis system of the first embodiment. As shown in this figure, the program analysis system (hereafter called "this system") has the data information extracting means 1 which extracts, from the source code of a computer program, data information representing the structure of each piece of data contained in the source code and the outputting means 2 which outputs extracted information (claim 1).

In addition, this system has the labeling means 3 which adds a position ID to each part of the source code and the pre-processor 4 which includes the include file of the source code into said source code.

This system also has the relation information extracting means 5 which, based on the source code and said data information, extracts relation information representing the relation among data items in each position in the source code (claim 1).

This system also has the process information extracting means 6 which, based on the source code, data information, and relation information, extracts relation information on each process in the source code as process information representing the process (claim 5).

In addition, this system has the specifying module 7 which specifies the extraction range, output range, and output form (corresponding to the analysis range specifying means (claim 8), output range specifying means (claim 9), and output form specifying means. This system also has the selecting means 8 which selects information associated with the specified range from each piece of the extracted information (claim 9). The outputting means 2 is constructed so that it is able to output specified information in the specified form.

(2) Operation and Effects of the First Embodiment

Figure 2:
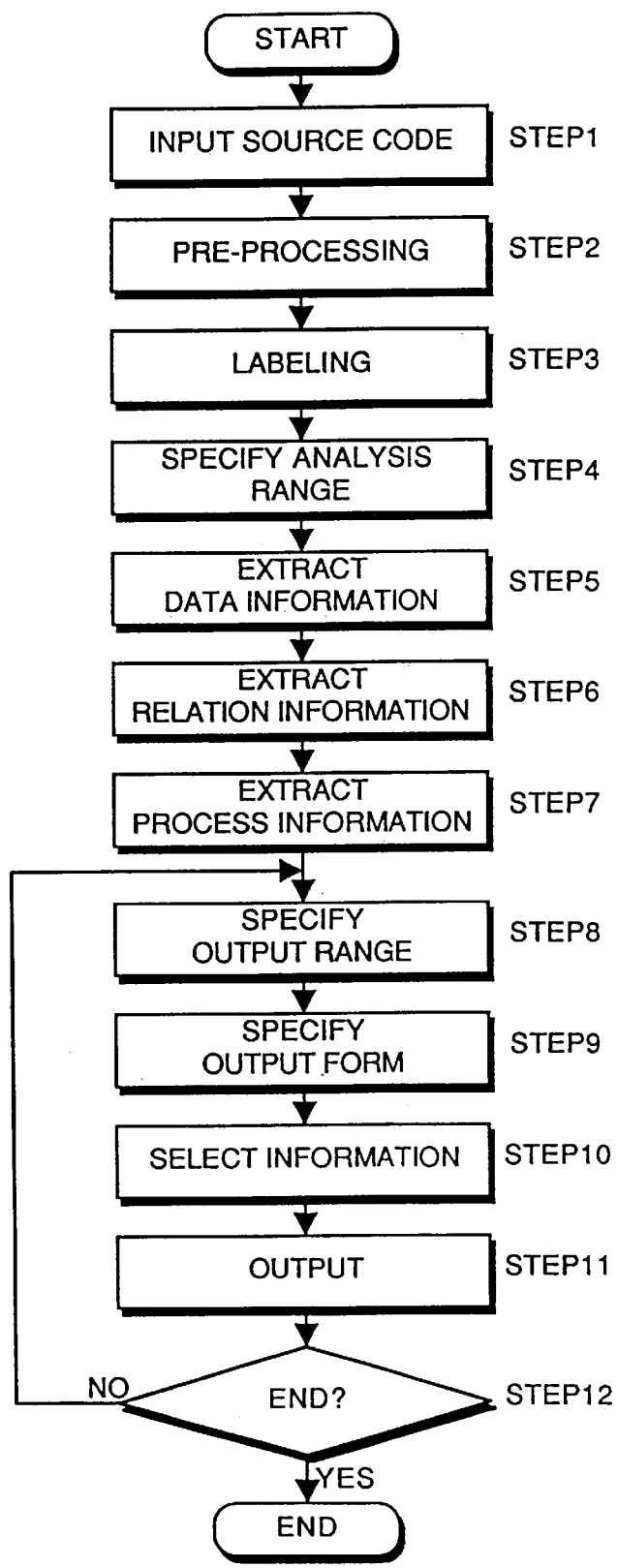
FIG. 2 is a flowchart showing the action of a program analysis system in the first embodiment of the present invention.

The first embodiment, which is configured as described above, analyzes and outputs the whole or part of the source code of a computer program as described below. FIG. 2 is a flowchart showing the operation procedure of the first embodiment. First, source code to be analyzed is entered from the keyboard or is read from a file (step 1).

[Pre-processing]

For the source code of a program written in a language, such as C, which uses an include file, the pre-processor 4 includes the include file into the source code (step 2). More specifically, the pre-processor performs processing usually done before execution and compilation; for example, it removes comment lines and expands macros. Therefore, in the first embodiment, there is no need for the user to do such processing in advance and to reference the include file during processing. For example, the include file in FIG. 4 is included into the source code in FIG. 3, and the result is as shown in FIG. 5.

Note that the pre-processor need not always be included into the system. The user may use a pre-processor to include an include file and then supply source code to this system.

This system may have a referencing means for referencing another file etc., which defines elements as data and procedures in the source code with the source code (claim 2). This allows the user to reference another file during process even in a program coded in such a language as C which supports the dividing compilation (claims 2 and 15), thereby eliminating the need to add necessary information into the source code beforehand.

[Labeling step]

Next, the labeling means 3 adds a position ID (including execution statement ID) to each part of the source code (step 3). For example, FIG. 6 shows an example where the execution statement IDs (a 4-digit number following "@S") are added to the execution statements in the source code shown in FIG. 3 and the position IDs are added immediately before the first execution statement and immediately after the last execution statement. Labeling may be applied separately to the original source code to which the include file is not yet added and to the source code to which the include file has been included.

As described above, a position ID is added to each part of the source code in the first embodiment, making it possible to perform several types of processing, such as information storage, retrieval, and output, based on the position ID of each process. It also makes it possible for the user to specify an analysis range or output range based only on the input and output of text.

[Analysis Range Specification Step]

The specifying module 7 enables the user to specify the range of analysis for extraction (step 4/claim 21). In the first embodiment, position IDs assigned to the source code may be used to specify a range. This range may also be specified by some other method. For example, the user may use a pointing device, such as a mouse, to move the cursor to specify a range. In this way, it is possible in the first embodiment to restrict a range, from which information is to be extracted, to a particular part of the source code, ensuring high efficiency (claims 8 and 21).

[Data Extraction Step]

Next, the data information extracting means 1 extracts data information, which represents the structure of data contained in the source code, from the source code (step 5/claim 14). That is, in this step, the system gets the table of data used in the source code. More specifically, the parser of the language is used to analyze the syntax to extract reserved words and other identifiers. The information on the data obtained in this manner helps the user understand what is executed in the source code.

Figure 7:
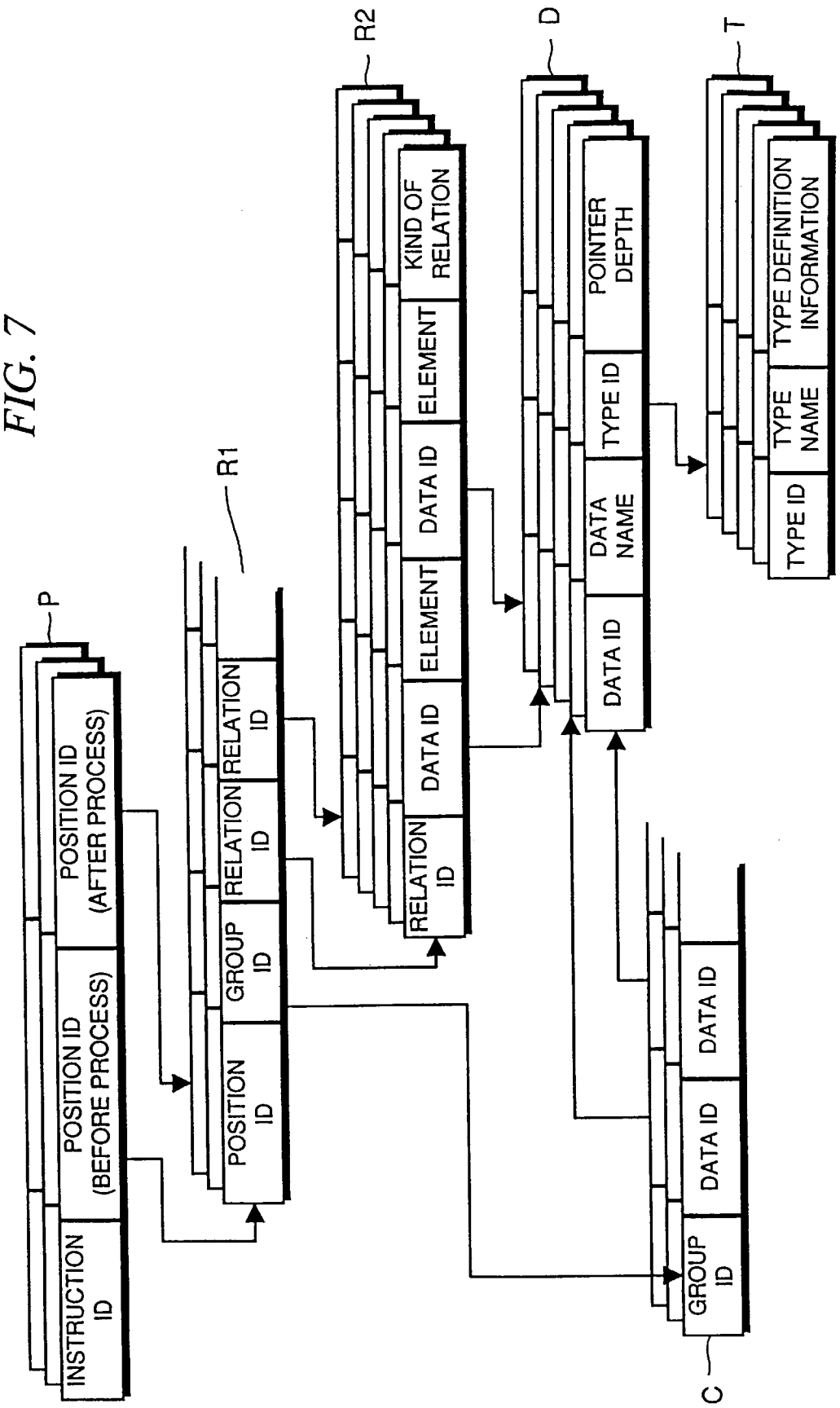
FIG. 7 shows the general storage format of each extracted information in the first embodiment of the present invention.

FIG. 7 is a conceptual diagram showing the general storage format of information extracted in this embodiment. As shown in this diagram, data information contains structure D in which information on each piece of data is stored and structure T in which information on each data type is stored. Structure D and structure T are connected by pointers (claims 3 and 16).

Each "structure" is a fixed-length or variable-length data area. Each structure D contains the data ID used as a retrieval key, the data name used in the source code, the type ID representing the type to which the data belongs, and the pointer depth indicator indicating the depth level of the pointer operator of the data.

Structure T contains the type ID used as a retrieval key, the type name in the source code, and type definition information representing the definition contents of the type. The type definition information represents configuration information which consists of structure definition or union definition configuration elements (that is, type name, member name, and tag name) in the order they are specified on the definition statement. The last element is followed immediately by the value of, for example, 0 which is used as the delimiter. For a basic type such as int or char, there is no configuration information and only the value of 0 is stored.

For example, data information in FIG. 8 is obtained from the source code in FIG. 5. This example shows the type definition information on "struct List", which consists of two members: the member "dummy" of "int" type and the member "next" of "struct List*" type.

As described above, because information on each data type is stored separately from information on data in the first embodiment, high memory efficiency can be maintained even when there are a plurality of data items of the same type. In addition, because structure D and structure T are connected by the pointer, data may be retrieved easily (claims 3 and 16).

[Relation Extraction Step]

Next, the relation information extracting means 5 extracts relation information representing the relation among data items for each position in the source code, based on the source code and data information (step 6/claim 14). This information identifies where and how each data item is related with other data items. This information allows the user to understand the contents of the source code.

More specifically, for each position ID of the source code (execution statement ID), the relation information extracting means identifies the relation type, such as the assignment relation, equivalence relation, and pointer reference, of data introduced by execution statements or data definition statements, and extracts and stores the result as relation data (claims 4 and 17). For example, for an assignment statement, it generates data representing the assignment relation and pointer reference relation according to the data type; for a conditional comparison statement, it generates data representing various types of equivalence relation according to the contents. The correspondence between a typical pattern for each statement and the relation among data to be generated for the pattern is stored beforehand in the knowledge database. In the first embodiment, not only the relation among data but also relation types are extracted. Therefore, the user can understand the relation among data and understand the contents of source code easily.

As shown in FIG. 7, the relation information consists of two structures: structure R1 in which relation IDs for each position are stored and structure R2 in which specific information on each relation is stored. Structure R1 contains a pointer to structure R2, and structure R2, in turn, contains a pointer to structure D in which data associated with the relation is stored.

Structure R1 contains the position ID which is a key indicating the position in the source code, a group ID which is a key indicating a group of data associated with each relation in the position, and one or more relation IDs each of which is a key indicating the relation associated with the position. And, for each group ID, structure C in which one or more data IDs contained in the group are stored is provided. Thus, in the first embodiment, structure C contains data IDs associated with each relation in the position, making it easy to retrieve various types of information.

Structure R2 contains the relation ID which is the retrieval key, one or more data IDs used to identify data associated with the relation, and one or more elements which indicate the details of each data item. The relation type indicates the type of relation.

Figure 9:
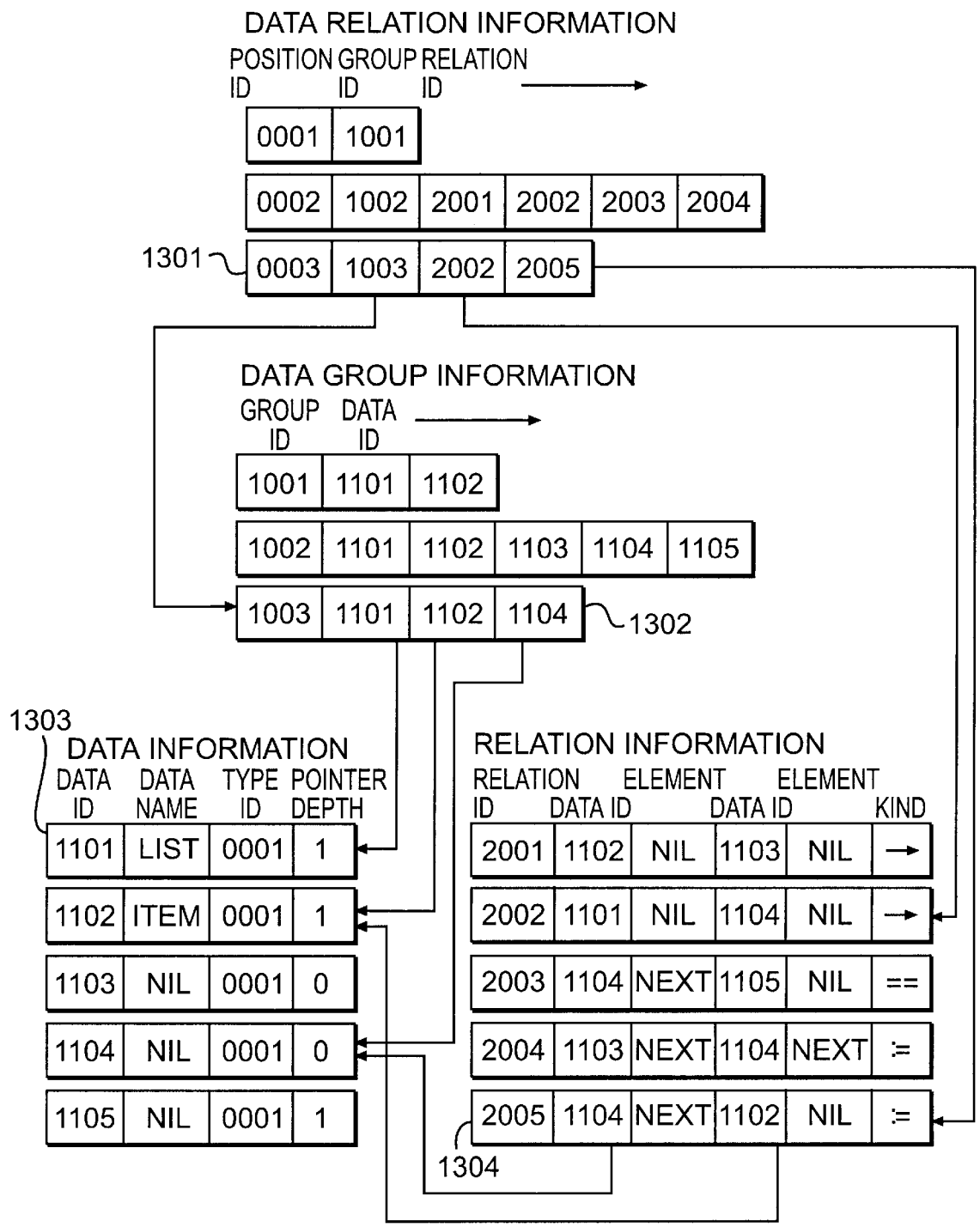
FIG. 9 shows examples of data information and relation information in the first embodiment of the present invention.

FIG. 9 is an example of data information and relation information. In this figure, the data name "nil" contained in the data information indicates an area referenced by a pointer or a right-hand side value which is dummy in the assignment. In the source code, a data name is not specified for an area referenced by a pointer; instead, the pointer is used as an I/O specification. The value of "nil" in an element in the relation information indicates that the element is not related but that the data indicated by the data ID is related. "-->", "==", and ":=" in the relation type indicates a pointer reference relation, equivalence relation, and assignment relation, respectively.

For example, in FIG. 9, the structure (R1) 1301 whose position ID is 0003 has the group ID 1003 and the relation IDs 2002 and 2005 as its elements. In addition, the structure (C) 1302 whose group ID is 1003 has data IDs 1101, 1102, and 1104 as its elements.

Data information may be obtained from these structures as follows. For example, the structure (D) 1303 whose data ID is 1101 indicates that the data name is "list", that the data type ID is 0001 (that is, "struct List"), and that the pointer depth level is 1. In the first embodiment, all data information related to a particular relation information item is obtained by finding the structure C with the use of the group ID in the relation information structure R1 as the key and then by reading information in the data information structure D with the use of data ID in the group structure C as the key.

Similarly, the structure (R2) 1304 indicates that the data ID 1102 (that is, the value of data "item" that is of the "struct List" pointer type) is assigned to the data ID 1104 (that is, the record "next" in the "struct List" type data area).

Because, in the first embodiment, information on each relation is stored in the structure R2 which is a structure separate from that in which information on each position is stored, memory efficiency is increased even when the same relation is in a plurality of of positions. In addition, the structure R1 and the structure R2, and the structure R2 and structure D, are connected by pointers respectively, data is retrieved easily.

[Process Extraction Step]

The process information extracting means 6 extracts relation information on each process (each execution statement) in the source code, based on the source code, data information, and relation information, as process information representing the process (step 7/claim 18). This information allows the user to understand how the data relation changes before and after each process contained in the source code, making it easy to understand the source code.

In this step, the process information extracting means extracts a combination of the relation information before the process and the relation information after the process as the process information on each process (claims 6 and 19). Therefore, it becomes easier to review, understand, and process not only the difference between before-process information and after-process information but also before-process information and after-process information themselves. The contents of the process information are not fixed; for example, the process information may consist only of the differences between before-process information and after-process information.

As shown in FIG. 7, there is a structure P for each execution statement which contain the position ID of before-process relation information and the position ID of after-process relation information. Because each structure P is connected to the structure R1 by a pointer, data may be retrieved easily.

The structure P contains the execution statement ID for an execution statement in the source code, the position ID of relation information before process of the execution statement, and the position ID of the relation information after the process. When extracting process information, the relation information is modified based on the relation between data items related indirectly by pointers (claims 7 and 20). This increases the accuracy of the relation information.

This means that the relation information implicitly assumed in the process of each execution statement is modified. For example, in FIG. 9, the data group (ID 1001) in the position @P0001 contains only two pointer values: list and item. However, as indicated in the description of the execution statement @S0001 (FIG. 6), two pointers are not null but point to areas. Therefore, it is necessary to assume that the data group in the position @P0001 must match data group in the position @P0002.

In addition, the relation indicated by the relation ID 2005 must be modified because the pointer list->next points to the area that is pointed to by the pointer "item" (that is, the area pointed to by the data ID 1103).

FIG. 10 shows the modified relation information. Modified parts are shaded. As a result, all the data relations before and after the process are determined. In this example, FIG. 11 shows the process information that is obtained.

[Output Range Specification Step]

When the analysis result is output, the specifying module may be used to specify the output range (step 8). The selecting means 8 selects information associated with the range specified by various types of extracted information (step 10/claim 22). Because it is possible in the first embodiment to limit the output range instead of outputting all the source code, it is easy to understand the output information.

Information is output on a display unit, and the display range is specified, for example, by the labels on the first and last execution statements or by the beginning and ending positions in the source code indicated by the cursor or the mouse pointer. In the information selection step (step 10), the process information and all the relation information and data information, directly or indirectly connected by the structure P of the process information, may be selected.

[Output Form Specification Step]

When information is output, the specifying module 7 may be used to specify the output form (step 9). Typically, the output form includes such options as the output detail level or output format. The output detail level specifies whether or not data type contents should be output with the relation information. The output format specifies whether information should be output only in the test format or in the graphical format. The first embodiment allows the user to specify the output information form, such as output detail level or output format, thus enabling him to produce output information tailored to his needs.

[Output Step]

Figure 12:
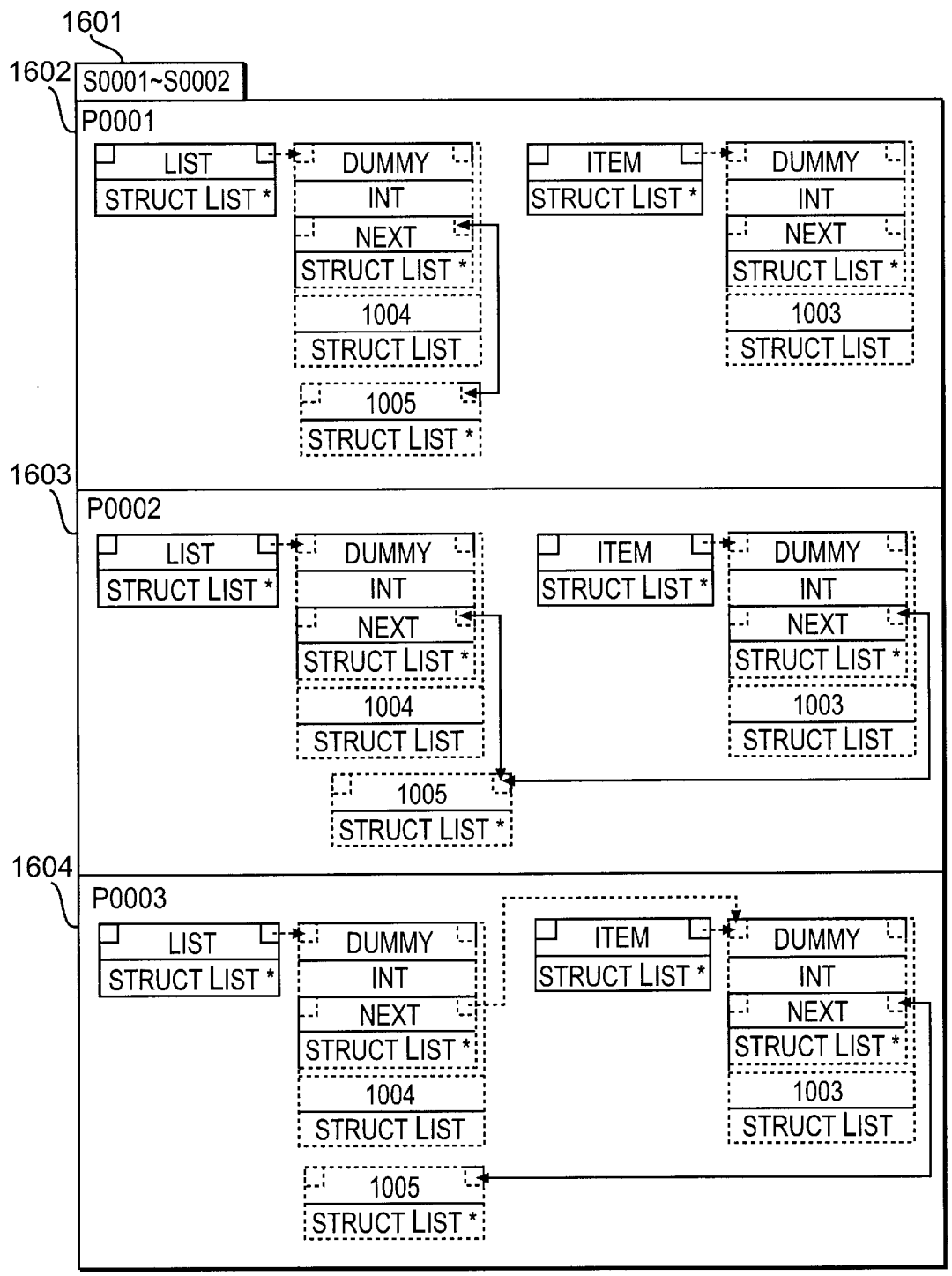
FIG. 12 shows an example of output in the first embodiment of the present invention.
Figure 13:
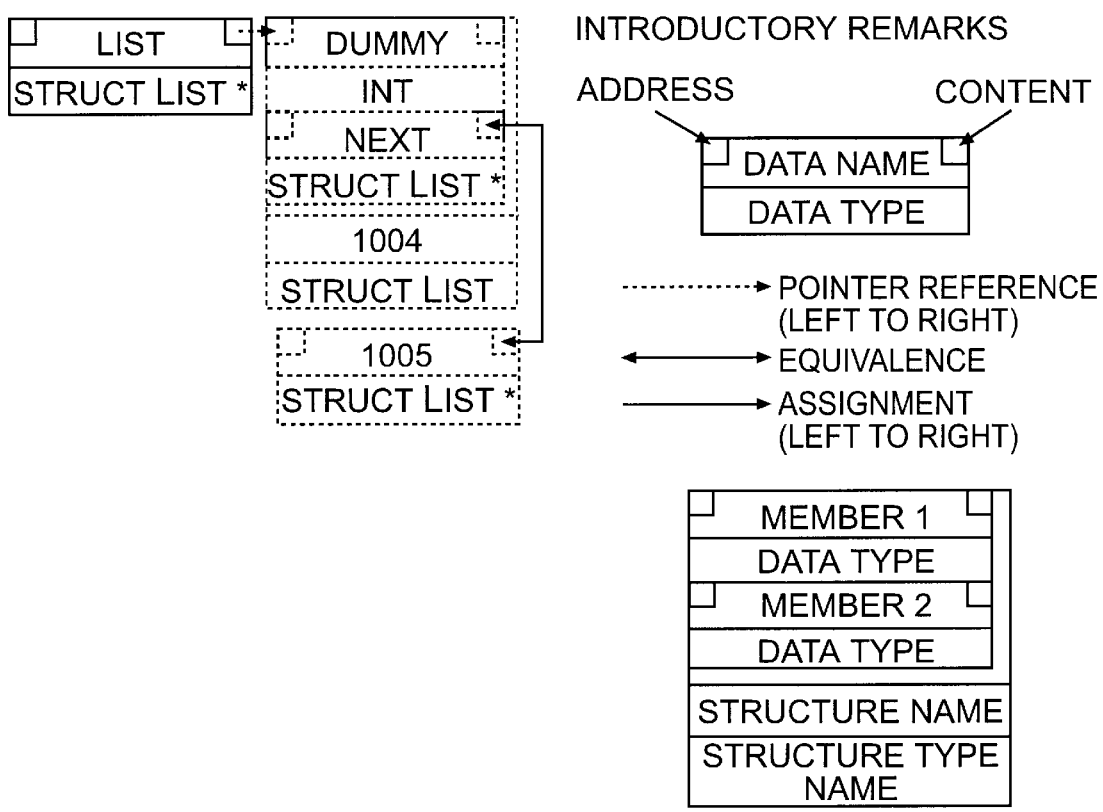
FIG. 13 shows the introductory remarks of output example of FIG. 12 in the first embodiment of the present invention.

Then, the outputting means 2 outputs extracted information in the specified form (step 11). For example, when the execution statements @S0001 to @S0002 are specified, the process information shown in FIG. 11 is output in the specified form. This output gives us information on the process contents as well as on the input/output specifications. FIG. 12 shows an output example, and FIG. 13 shows the introductory remarks used for the output example.

Figure 14:
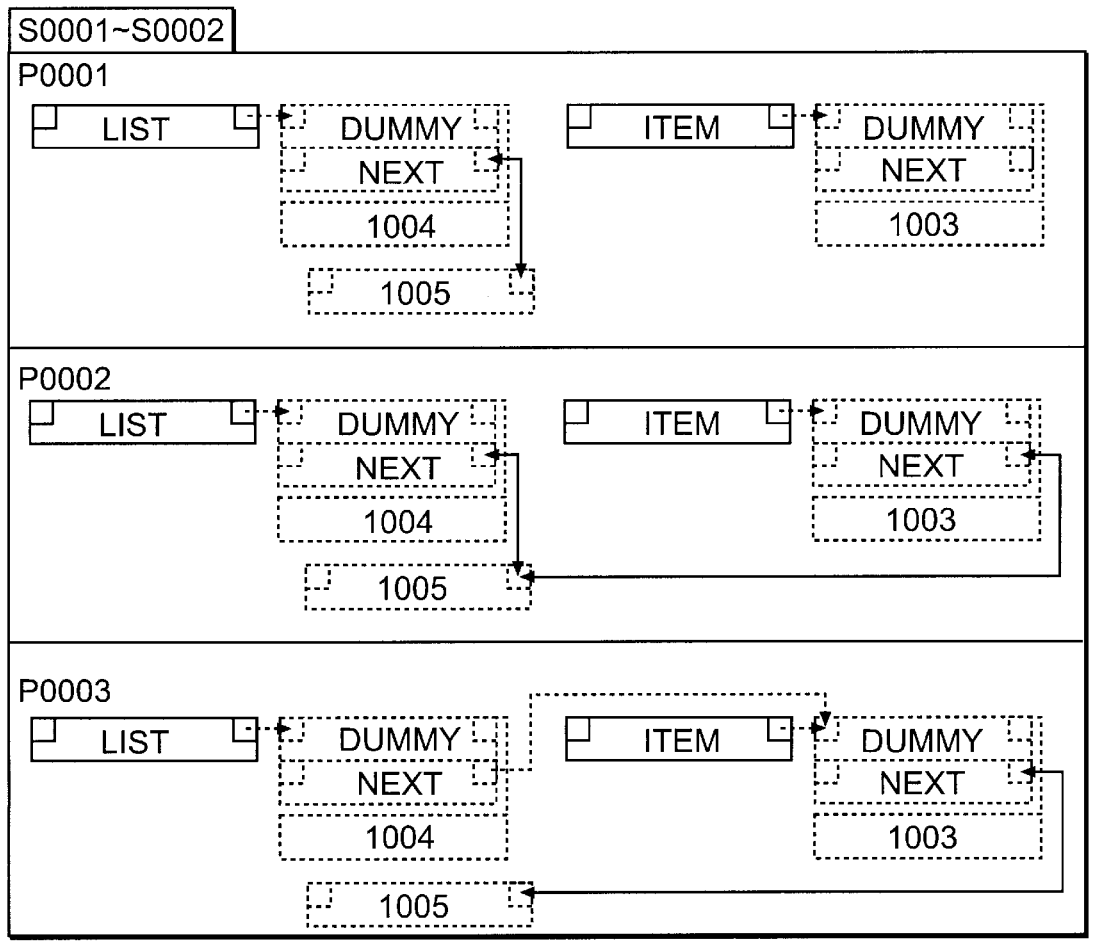
FIG. 14 shows an another example of output example in the first embodiment of the present invention.

For example, the display range display part in FIG. 12 contains the range of execution statement IDs to be displayed. The data relation display parts 1602, 1603, and 1604 each contain position IDs and the data relations in the position IDs. Although not described directly in the source code, input/output data is indicated by the dotted line. FIG. 14 shows an example in which only data names are contained.

Once analysis is performed, steps 8 to 12 may be repeated to check the output at various abstraction levels or in various formats. To analyze new source code, it is necessary to begin with step 1.

As described above, the first embodiment allows the user to statically and efficiently analyze process contents and input/output specifications described in computer program source code at any abstraction level. This makes the source code inspection easier and increases the efficiency of the error checking task in the software test process. This embodiment also increases the efficiency of modification task in the maintenance process when a new function is added.

(3) Second Embodiment

The following shows an example in which a program containing control structures is analyzed. For a program coded in the structured programming language such as the C language, the control structures are sequence, repetition, and selection. Out of these structures, the sequence control structure is analyzed as described above.

The repetition structure is analyzed as follows. The repetition structure is divided roughly into the initialization part (for example, counter initialization. Hereafter, this is called the "initialization part") and the repetition part (hereafter called "repetition" part). The repetition part also contains the condition evaluation part.

In this case, the first detecting means for detecting an repetition structure in the source code is provided. And, the selecting means is constructed so that it selects information on the process for zero repetition and two repetitions (claims 10 and 23). This enables necessary information on the repetition to be output, increasing the analysis efficiency.

More specifically, there are a plurality of methods for executing repetition structures in the C language. All these methods are common in that they contain the above two components. In the following discussion, the program contains the for statement (FIG. 15) and the include file is the same one as shown in FIG. 4.

In analyzing the program containing the repetition structure, the analysis results for the above initialization part and the repetition part are provided. That is, though a plurality of results can be usually generated in the repetition structure, only the process for a zero repetition and two repetitions need be analyzed to check the validity of data processing (Reference: J. C. Huang, Houston University, "Direction of Data Flow Anomaly Through Program Instrumentation").

Figure 16:
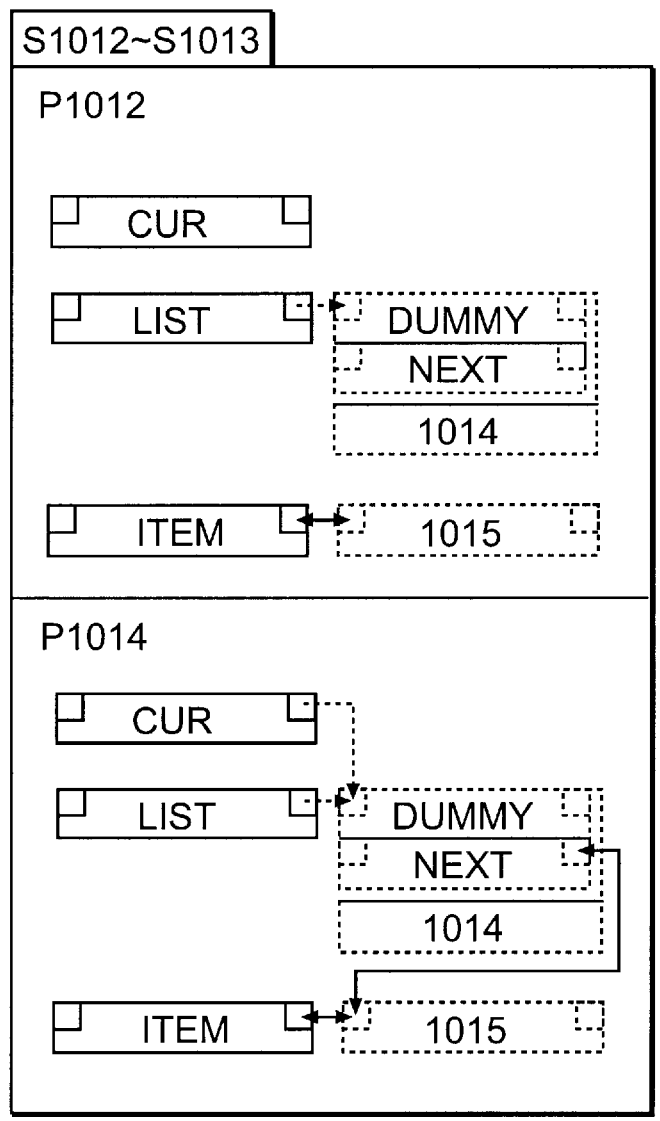
FIG. 16 shows an output example for process of zero times repeat of the source code shown in FIG. 15 in the second embodiment of the present invention.
Figure 17:
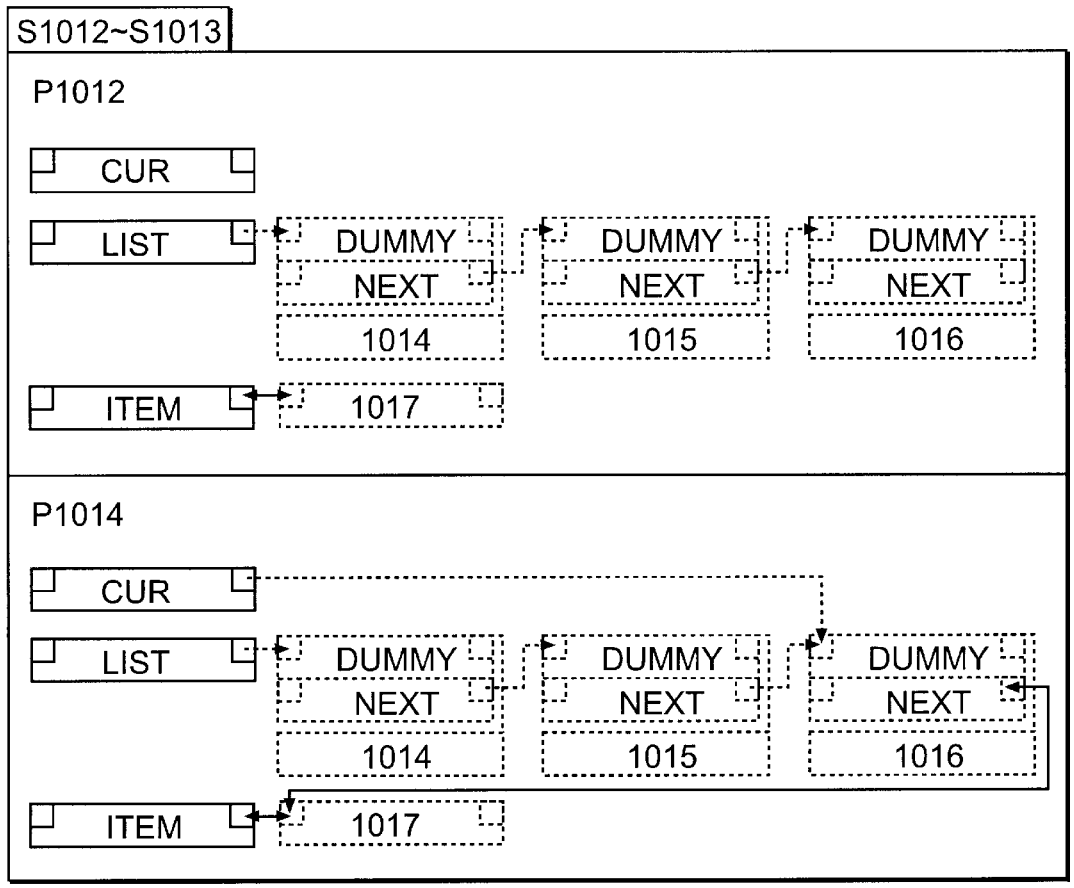
FIG. 17 shows an output example for process of two times repeat of the source code shown in FIG. 15 in the second embodiment of the present invention.

In this case, the output range containing the repetition structure may be determined by the first detecting means or the selecting means, execution statement IDs may be specified to indicate the repetition count. In either case, the result shown in FIG. 16 is obtained for the zero repetition in which @P1012, @P1012, and @P1013 are selected in this order. And, the result shown in FIG. 17 is obtained for two repetitions in which @P1012, @S1012, @S1012, @S1012, and @P1013 are selected in this order.

Because only the information on the repetition in the same position is necessary, the repetition count is not restricted to zero and two; a plurality of repetitions or one or less repetition may be combined.

That is, it is known that the data relations are clarified by comparing data relations with no repetition and data relations after a plurality of repetitions.

(4) Third Embodiment

The selection structure is analyzed as follows. The selection structure is divided roughly into the part where the selection condition is evaluated (hereafter called "selection condition evaluation part") and the part where statements are actually executed when selected (hereafter called "selection part"). In this case, there are as many selection parts as there are branches in the selection condition evaluation part.

In this case, the second detecting means for detecting a selection structure in the source code is provided. And, the selecting means is constructed so that it selects information on each process corresponding to each branch of a condition for the part of the detected repetition structure (claims 11 and 24). This enables necessary information on the result of selection condition to be output, making the information on the selection structure easy to understand.

More specifically, there are a plurality of methods for executing selection structures in the C language. All these methods are common in that they contain the above two components. In the following discussion, the program contains the if statement (FIG. 18) and the include file is the same one as shown in FIG. 4.

Figure 19:
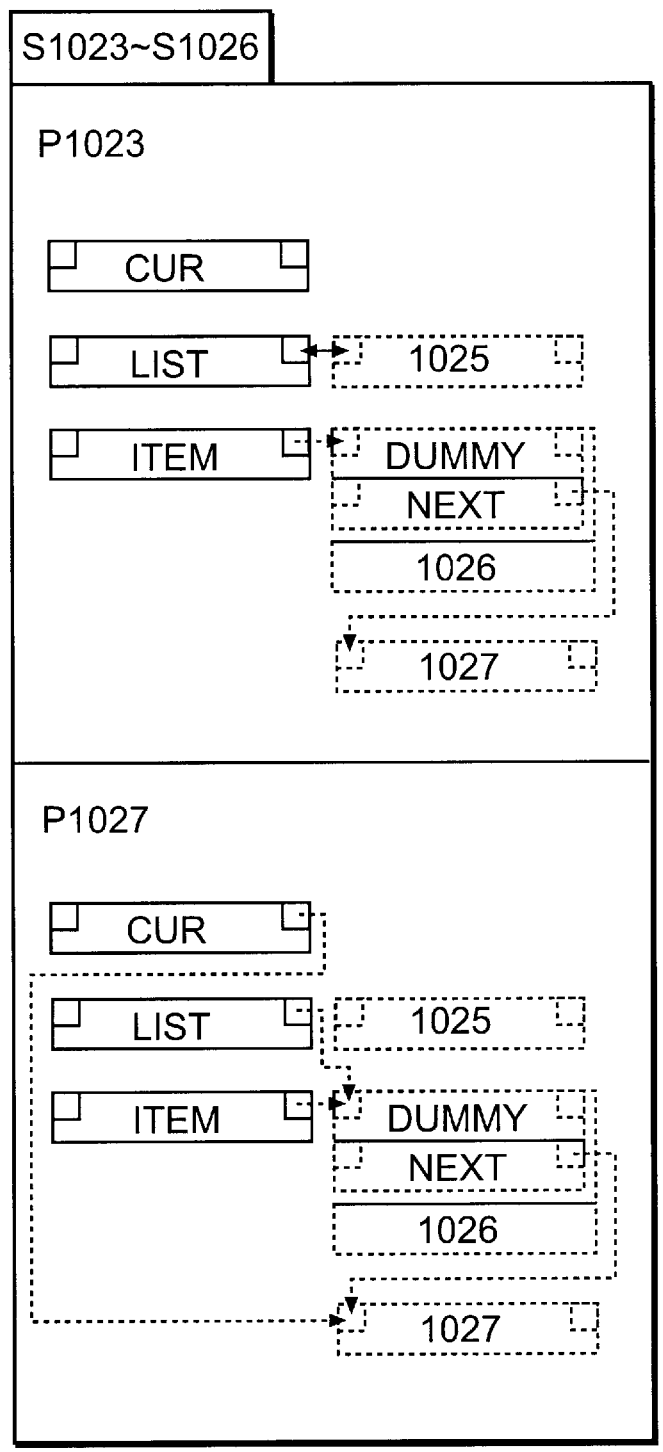
FIG. 19 shows an example of output for the process in case of the condition is TRUE in the source code of FIG. 18 in the third embodiment of the present invention.
Figure 20:
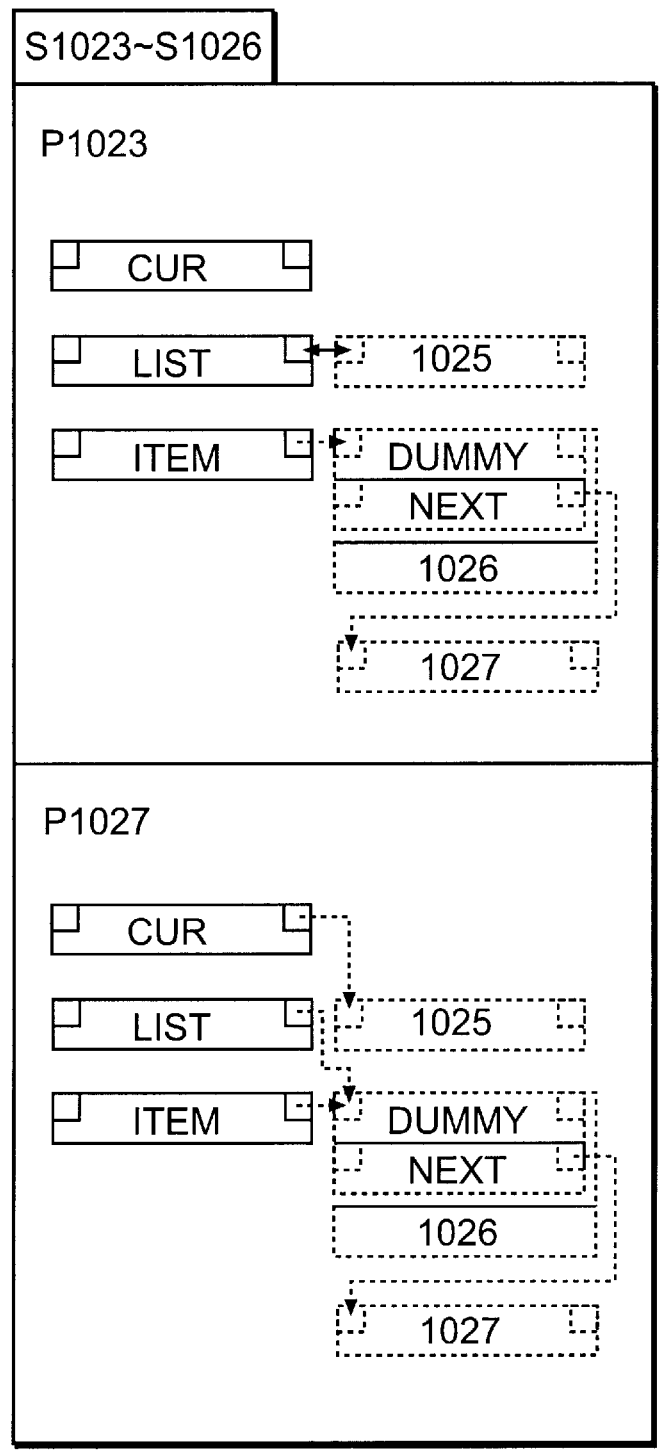
FIG. 20 shows an example of output for the process in case of the condition is FALSE in the source code of FIG. 18 in the third embodiment of the present invention.

In analyzing the program containing the selection structure, the analysis results for the above selection condition evaluation part and the selection part are provided. In this case, the display range containing the selection structure may be determined by the second detecting means or the selecting means, or execution statement IDs may be specified to indicate the selection part to be analyzed. In either case, when the condition is true, the result shown in FIG. 19 is obtained where @P1023, @S1024, and @P1027 are selected in this order. When the condition is false, the result shown in FIG. 20 is obtained where @P1023, @S1025, and @P1027 are selected in this order.

(5) Fourth Embodiment

Displaying source code and the analysis result of the source code at the same time makes the correspondence between them much easier to understand (claims 12 and 25).

More specifically, the source code and the analyzed result of the source code are displayed on the same display unit or on neighboring display units at the same time (claims 12 and 25). The user uses the mouse or keyboard to specify a desired source code statement or a desired range. Except for a redundant statement, each statement in the source code should be involved in the generation of data relation contained in the final output result. Therefore, the analysis result corresponding to the specified range is highlighted, for example, by displaying it in reverse video (claims 13 and 26).

Conversely, a desired data relation contained in the analysis result may be specified. Each data relation should be generated based on a particular statement or a particular set of statements in the source code. Thus, a statement or a set of statements in the source code corresponding to the specified data relation are highlighted, for example, by reverse video (claims 13 and 26).

Figure 21:
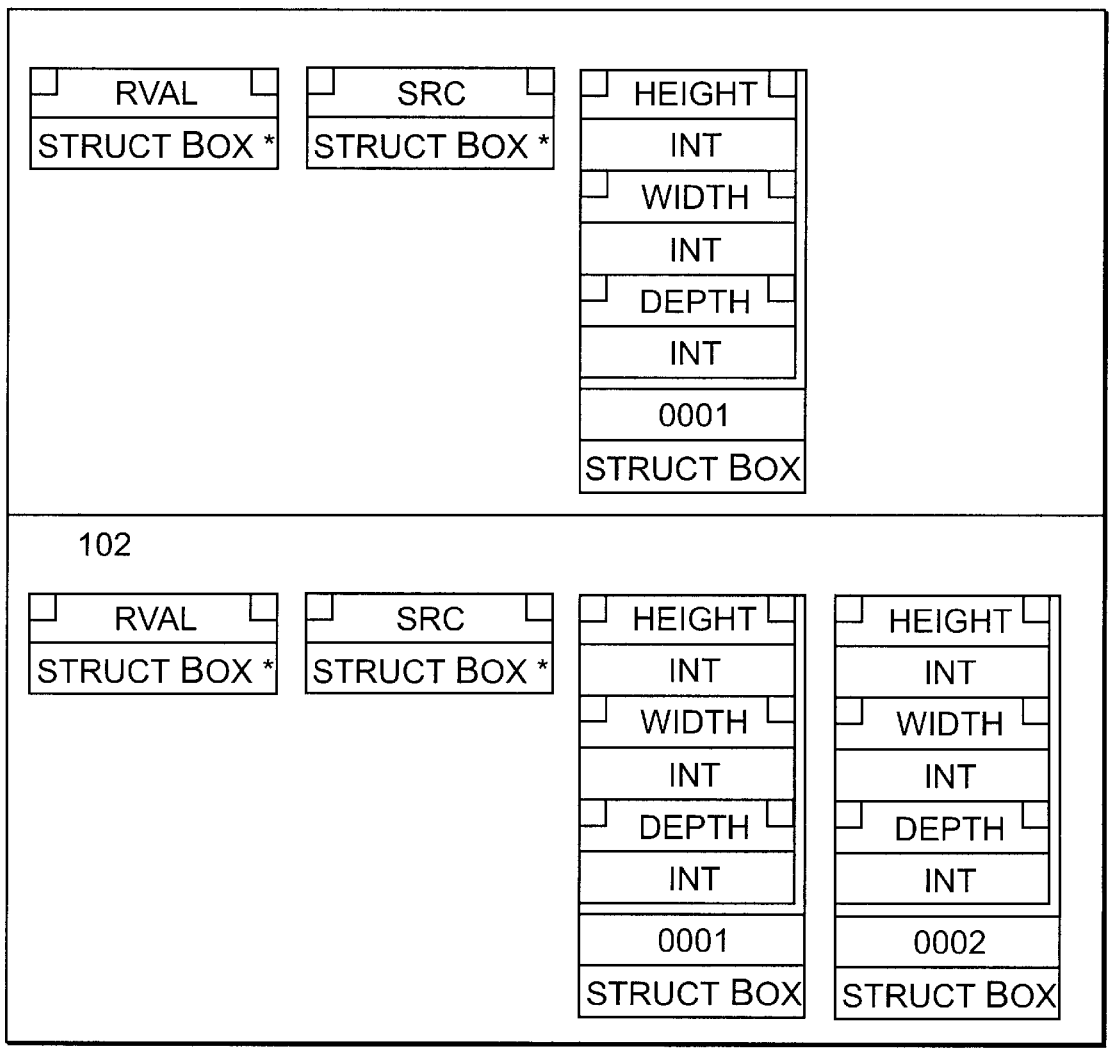
FIG. 21 shows an example of a display generated in the fourth embodiment.

FIG. 21 shows an example of display generated in the fourth embodiment. In this display example, statement 101 in the source code and relation 102 indicated by the dotted line arrow are associated each other. When one of them is specified, the other is highlighted.

For example, when a problem is found during revision, this feature is used to identify the part of source code associated with the problem. Conversely, in order to make sure that the source code implementation generates the expected result, this feature is used to identify the part of source code affected by the revision.

(6) Other Embodiments

This invention is not restricted to the preferred embodiments described herein, but may be embodied in other specific forms, such as those described below, without departing from the spirit or essential characteristics thereof. For example, programs to be analyzed are not restricted to those coded in the C language; instead, this invention may be used to analyze programs coded in other structured programming languages. Of course, even if a non-structured statement such as the GOTO statement is included, the analysis result may be obtained by explicitly specifying the execution statement ID.

In addition, the data format is not restricted to that shown in each embodiment, but any format may be used. The output object specifying means, first detecting means, second detecting means, output range specifying means, selecting means, analysis range specifying means, process information extracting means, relation exacting means, referencing means, and pre-processor need not be provided.

This invention may be used to analyze any combinations of control structures (for example, a nest of combinations of the repetition structure of the second embodiment and the selection structure of the third embodiment).

As described above, the present invention efficiently analyze a source code of a computer program by static analysis, and makes it easy to understand the source code contents including the process contents and input/output specifications by providing the result of the analysis.

While a program analysis system and method have been disclosed, the invention may be further embodied in a computer-readable memory, such as a floppy disk, storing program code for practicing the program analysis method.

While a preferred embodiment has been described, variations thereto will occur to those skilled in the art within the scope of the present inventive concepts which are delineated by the following claims.

What is claimed is:

1. A program analysis system for analyzing a source code of a computer program which represents processes for data comprising:
   a data information extracting means for extracting data information which represents a structure of each data;
   a relation information extracting means for extracting relation information between data of specified position in the source code based on the source code and the data information; and
   a process information extracting means for extracting each relation information about specified process in the source code as process information based on the source code, the data information and the relation information.

2. A program analysis system of claim 1;
   further comprising a referencing means for referencing another file relating to the source code with the source code.

3. A program analysis system of claim 1;
   wherein the data information has a structure D for storing the information of each data and a structure T for storing the information of each data type; and
   the structure D is related to corresponding structure T.

4. A program analysis system of claim 1;
   wherein the relation information extracting means extracts a kind of the relation.

5. A program analysis system of claim 1, further comprising an analysis range specifying means for specifying a range of the extracting.

6. A program analysis system of claim 1, further comprising:
   an outputting range specifying means for specifying a range of the extracted data to be output; and
   a selecting means for selecting information corresponding to the specified range from each extracted information.

7. A program analysis system of claim 6, further comprising:
   a first detecting means for detecting a repetition structure in the source code;
   wherein the selecting means selects the information of process for two or more times repeats and one or less time repeat about a part of the detected repetition structure.

8. A program analysis system of claim 6, further comprising:
   a second detecting means for detecting a selection structure in the source code;
   wherein the selecting means selects the information of each process corresponding to each branch of a condition for the selection for a part of the detected selection structure.

9. A program analysis system of claim 1, wherein the source code and one of the extracted information are displayed on a same display unit or on neighboring display units.

10. A program analysis system of claim 9, wherein, when a part of the source code or the information is specified, the part of the counterpart corresponding to the specified part is highlighted.

11. A program analysis system of claim 1, wherein the process information extracting means extracts a combination of the relation information before the process to be performed by the source code and the relation information after the process to be performed by the source code.

12. A program analysis system of claim 11, wherein the process information extracting means has:
   a consistency detecting means for detecting a consistency between data by tracing the relation information; and
   a modifying means for modifying the relation information based on the consistency detected by the consistency detecting means.

13. A program analysis system for analyzing a source code of a computer program which represents processes for data comprising:
   a data information extracting means for extracting data information which represents a structure of each data;
   a relation information extracting means for extracting relation information between data of specified position in the source code based on the source code and the data information; and
   an analysis range specifying means for specifying a range of the extracting.

14. A program analysis system for analyzing a source code of a computer program which represents processes for data comprising:
   a data information extracting means for extracting data information which represents a structure of each data;
   a relation information extracting means for extracting relation information between data of specified position in the source code based on the source code and the data information;
   an outputting range specifying means for specifying a range of the extracted data to be output; and
   a selecting means for selecting information corresponding to the specified range from each extracted information.

15. A program analysis system of claim 14, further comprising:
   a first detecting means for detecting a repetition structure in the source code;
   wherein the selecting means selects the information of process for two or more times repeats and one or less time repeat about a part of the detected repetition structure.

16. A program analysis system of claim 14, further comprising:
   a second detecting means for detecting a selection structure in the source code;
   wherein the selecting means selects the information of each process corresponding to each branch of a condition for the selection for a part of the detected selection structure.

17. A program analysis system for analyzing a source code of a computer program which represents processes for data comprising:
   a data information extracting means for extracting data information which represents a structure of each data; and
   a relation information extracting means for extracting relation information between data of specified position in the source code based on the source code and the data information;
   wherein the source code and one of the extracted information are displayed on a same display unit or on neighboring display units.

18. A program analysis system of claim 17, wherein, when a part of the source code or the information is specified, the part of the counterpart corresponding to the specified part is highlighted.

19. A program analysis method for analyzing a source code of a computer program which represents processes for data comprising steps for:

extracting data information which represents a structure of each data;

extracting relation information between data of specified position in the source code based on the source code and the data information; and extracting each relation information about specified process in the source code as process information based on the source code, the data information and the relation information.

20. A program analysis method of claim 19, further comprising a step for referencing another file relating to the source code with the source code.

21. A program analysis method of claim 19, wherein the data in formation has a structure D for storing the information of each data and a structure T for storing the information of each data type; and the structure D is related to corresponding structure T.

22. A program analysis method of claim 19, wherein the step for extracting the relation information extracts a kind of the relation.

23. A program analysis method of claim 19, wherein the step for extracting the process information extracts a combination of the relation information before the process to be performed by the source code and the relation information after the process to be performed by the source code.

24. A program analysis method of claim 23, wherein the step for extracting the process information has:

a step for detecting a consistency between data by tracing the relation information; and a step for modifying the relation information based on the consistency detected by the step for detecting the consistency.

25. A program analysis method of claim 19, further comprising a step for specifying a range of the extracting.

26. A program analysis method of claim 19, further comprising:

a step for specifying a range of the extracted data to be output; and a step for selecting information corresponding to the specified range from each extracted information.

27. A program analysis method of claim 26, further comprising:

a step for detecting a repetition structure in the source code;

wherein the step for selecting selects the information of process for two or more times repeats and one or less time repeat about a part of the detected repetition structure.

28. A program analysis method of claim 26, further comprising:

a step for detecting a selection structure in the source code;

wherein the step of selecting selects the information of each process corresponding to each branch of a condition for the selection for a part of the detected selection structure.

29. A program analysis method of claim 19, wherein the source code and one of the extracted information are displayed on a same display unit or on neighboring display units.

30. A program analysis method of claim 19, wherein, when a part of the source code or the information is specified, the part of the counterpart corresponding to the specified part is highlighted.

31. A program analysis method for analyzing a source code of a computer program which represents processes for data comprising steps for:

extracting data information which represents a structure of each data;

extracting relation information between data of specified position in the source code based on the source code and the data information; and specifying a range of the extracting.

32. A program analysis method for analyzing a source code of a computer program which represents processes for data comprising steps for:

extracting data information which represents a structure of each data;

extracting relation information between data of specified position in the source code based on the source code and the data information;

specifying a range of the extracted data to be output; and selecting information corresponding to the specified range from each extracted information.

33. A program analysis method of claim 32, further comprising:

a step for detecting a repetition structure in the source code;

wherein the step for selecting selects the information of process for two or more times repeats and one or less time repeat about a part of the detected repetition structure.

34. A program analysis method of claim 32, further comprising:

a step for detecting a selection structure in the source code;

wherein the step for selecting selects the information of each process corresponding to each branch of a condition for the selection for a part of the detected selection structure.

35. A program analysis method for analyzing a source code of a computer program which represents processes for data comprising steps for:

extracting data information which represents a structure of each data; and extracting relation information between data of specified position in the source code based on the source code and the data information;

wherein the source code and one of the extracted information are displayed on a same display unit or on neighboring display units.

36. A program analysis method of claim 35, wherein, when a part of the source code or the information is specified, the part of the counterpart corresponding to the specified part is highlighted.

* * * * *

UNITED STATES PATENT AND TRADEMARK OFFICE
CERTIFICATE OF CORRECTION

PATENT NO. : 5,862,382
DATED : January 19, 1999
INVENTOR(S) : Yoshio KATAOKA

It is certified that error appears in the above-identified patent and that said Letters Patent is hereby corrected as shown below:

Title page item [56], in the Attorney, Agent, or Firm, line 2, "L. L. P." should read --L.L.P.--.

Claim 2, column 11, line 22, "1;" should read --1,--.

Claim 3, column 11, line 26, "1;" should read --1,--.

Claim 4, column 11, line 31, "1;" should read --1,--.

Claim 21, column 13, line 22, "in formation" should read --information--.

Claim 30, column 14, line 5, "claim 19" should read --claim 29--.

Signed and Sealed this

Fifteenth Day of August, 2000

Attest:

Q. TODD DICKINSON

*Attesting Officer*   *Director of Patents and Trademarks*